United States Patent [19]

Clerc et al.

[11] Patent Number: 4,639,090

[45] Date of Patent: Jan. 27, 1987

[54] LIQUID CRYSTAL DICHROIC DISPLAY WITH A HIGH BRIGHTNESS CONTRAST

[75] Inventors: Jean-Frédéric Clerc, Meylan; Francis Muller, Seyssinet, both of France

[73] Assignee: Commissariat a l'Energie Atomique, Paris, France

[21] Appl. No.: 736,816

[22] Filed: May 22, 1985

[30] Foreign Application Priority Data

May 30, 1984 [FR] France ................... 84 08547

[51] Int. Cl.$^4$ .............................................. G02F 1/13
[52] U.S. Cl. .................. 350/346; 350/347 E; 350/349
[58] Field of Search ............... 350/346, 349, 350 R, 350/347 E

[56] References Cited

U.S. PATENT DOCUMENTS

| 4,278,328 | 7/1981 | Mukoh et al. | 350/346 X |
| 4,398,805 | 8/1983 | Cole | 350/346 X |

FOREIGN PATENT DOCUMENTS

| 55-127520 | 10/1980 | Japan | 350/346 |
| 58-193523 | 11/1983 | Japan | 350/346 |

OTHER PUBLICATIONS

Ishibashi, T. et al., "On the Multiplexing of the Phase Change Type Color LCD," 1980 *Biennial Display Research Conf.*, (Oct. 1980), pp. 186–188.

Scheffer, T. J., "Electrically Controlled Colour Filters Using Liquid Crystals," Institute of Physics Conference Series, No. 40 (Brighton, U.K. 12–15 Sep. 1977), pp. 65–86.

*Primary Examiner*—John K. Corbin
*Assistant Examiner*—Richard F. Gallivan
*Attorney, Agent, or Firm*—James E. Nilles

[57] ABSTRACT

The display comprises a cholesteric liquid crystal film in which are embedded dye molecules between the two walls separated by a shim. One wall is at least partly covered by a reflecting coating reversing the polarization of a circularly polarized electromagnetic wave. The optical anisotropy $\Delta n$ and the helix pitch p are such that the least absorbed wave on passing through the cell has an ellipticity equal to or greater than $\pi/8$.

6 Claims, 7 Drawing Figures

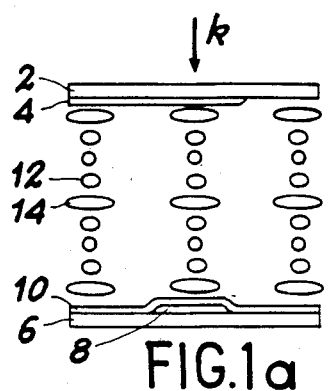 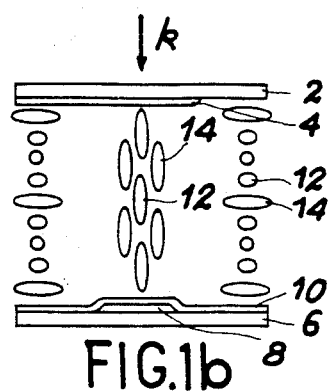
FIG.1a  FIG.1b
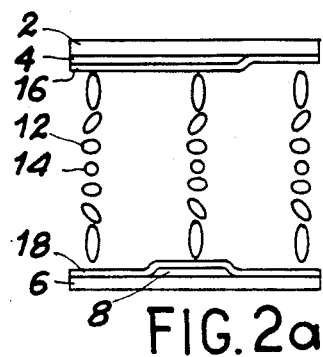 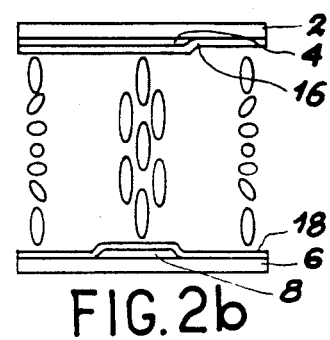
FIG.2a  FIG.2b
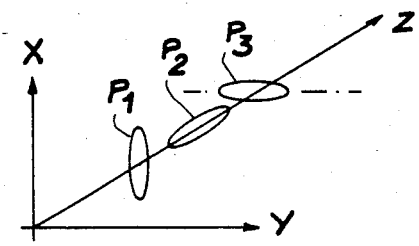
FIG.3a
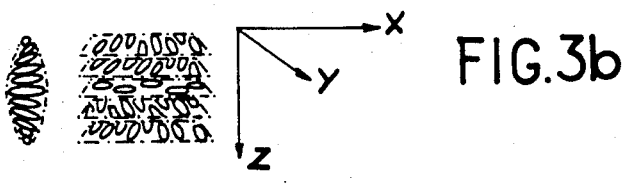
FIG.3b

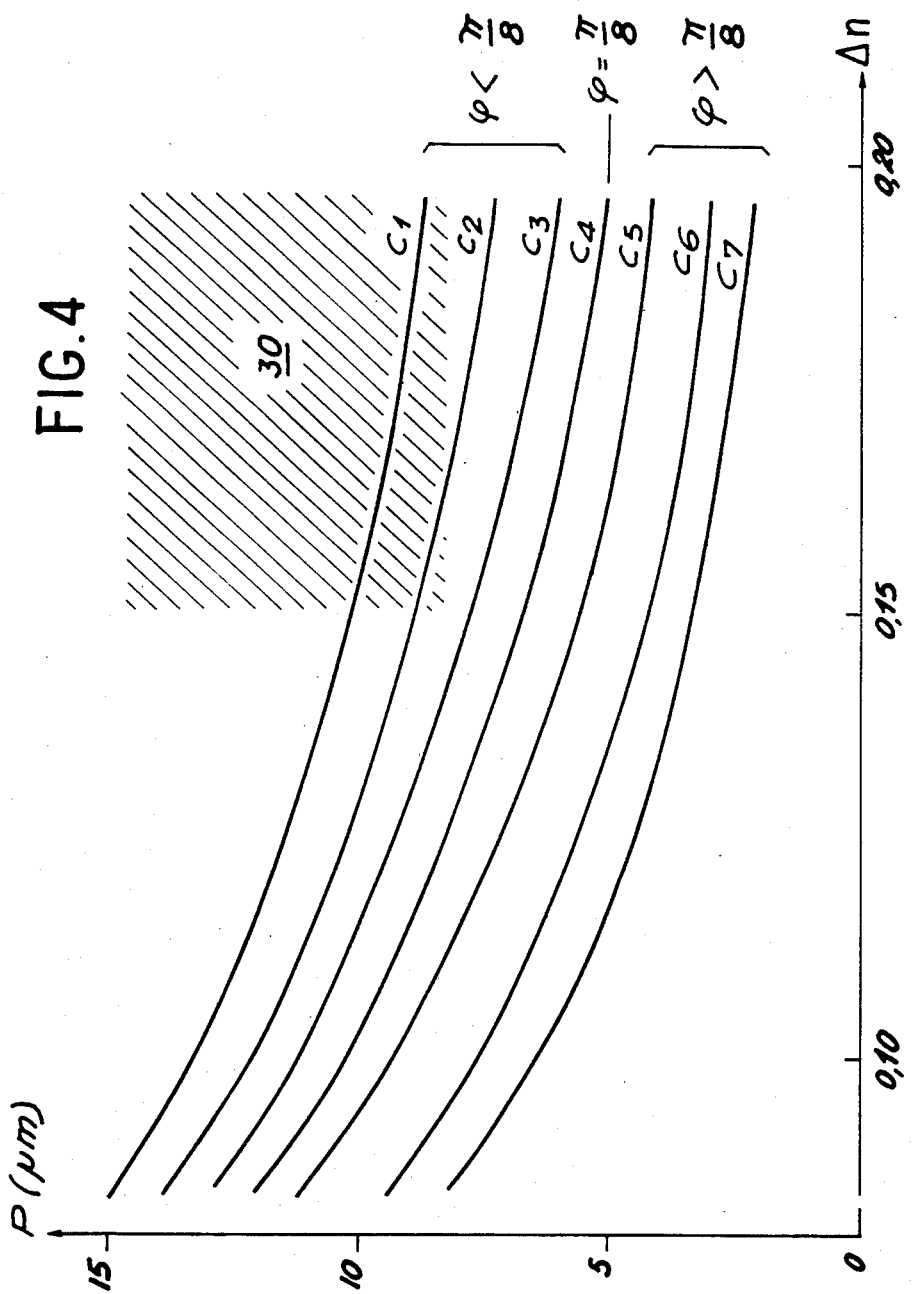

LIQUID CRYSTAL DICHROIC DISPLAY WITH A HIGH BRIGHTNESS CONTRAST

BACKGROUND OF THE INVENTION

The present invention relates to a liquid crystal dichroic display with cholesteric-homeotropic phase transition. The object is to achieve a better contrast of these displays used in reflection.

A liquid crystal cell comprises two walls separated by a shim between which is inserted a liquid crystal film, one wall carrying the transparent electrodes and the other a counterelectrode.

Dichroic displays are liquid crystal cells in which colouring agents or dyes are dissolved in the liquid crystal film. These dyes are elongated molecules, whose transition moment is generally directed along the molecule axis. They absorb the component of light, whose polarization vector is directed perpendicular to said axis, whilst excluding orthogonal components.

A first type of dichoic display is known, called a Heilmeier cell, which has a homeotropic-planar phase transition.

In the homeotropic phase, the molecules of the liquid crystal and dye are perpendicular to the cell walls. Thus, an incident light traversing the cell is transmitted without absorption.

In the planar phase, the molecules of liquid crystal and dye are aligned in a single direction contained in a plane parallel to the walls, so that they absorb the incident light. This absorption only takes place in one direction, which is that of the major axis of the dye molecules. To maximize the absorption, it is consequently necessary to provide a polarizer above the cell, so that the incident light is polarized in a linear manner parallel to the axis of the dye molecules before passing through the cell.

In the case where such a cell is used in reflection, the lower wall must be covered with a metallic coating, so that the reflected light retains its linear polarization, so that it is absorbed on return.

As a result of its absorption, the polarizer limits the brightness of the display. Moreover, the cost of this polarizer and its poor behaviour at high temperatures (approx. 90° C.) and in the presence of moist atmospheres make this display relatively unsatisfactory.

Another type of dichroic display is known which requires no polarizer. This display, called a White-Taylor cell, uses a cholesteric-homeotropic phase transition.

In a cell of this type, use is made of a cholesteric liquid crystal, i.e. a liquid crystal whose molecules are chiral, and mixed with a dye. The assembly has a helical structure. The dye molecules are oriented in the direction of the liquid crystal molecules and consequently appear successively in all directions. Thus, the light passing through the cell is absorbed, no matter what its polarization.

This cell is preferably used in reflection because the light passing twice through the liquid crystal film is better absorbed, so that the contrast is improved.

It is also generally accepted that the base of the cell, on which the incident light is reflected, must be diffusing and must not preserve the polarization of the incident light. These diffusers are often outside the cell, and are e.g. made from paper or manganese oxide. The function of the diffuser is consequently to provide, following diffusion, with a random polarization to the reflected light.

SUMMARY OF THE INVENTION

The present invention proposes the use of a metallic coating as the light reflecting coating, i.e. it retains the polarization of a linearly polarized wave, but reverses the polarization of a circularly polarized wave. This leads to a considerable improvement to the display contrast. However, this improvement is not obtained for all cells, but only in the case where the optical anisotropy and the pitch of the twisted or helical structure of the liquid crystal assume special values.

More specifically, the present invention relates to a liquid crystal dichroic display with a high brightness contrast, comprising a liquid crystal film between two walls separated by a shim, one wall carrying transparent electrodes and the other wall a counterelectrode, said liquid crystal film having an optical anisotropy $\Delta n$ and, in the absence of an electric field, a twisted or helical structure of pitch p, the wall carrying the counterelectrode being at least partly covered with a reflecting coating reversing the polarization of a circularly polarized electromagnetic wave and the optical anisotropy $\Delta n$ and the pitch p being such that the light wave absorbed least by the display used in transmission has an ellipticity at least equal to $\pi/8$.

A wave having an ellipticity equal to $\pi/8$ is midway between a linear wave (zero ellipticity) and a circular wave (ellipticity equal to $\pi/4$).

According to a preferred embodiment of the dichroic display according to the invention, the reflecting coating is constututed by a counterelectrode.

In a preferred manner, the liquid crystal film in the dichroic display according to the invention comprises a mixture of nematic liquid crystals, dichroic molecules and a chiral compound.

According to a secondary feature, the chiral compound is a cholesteric liquid crystal.

According to another secondary feature, the dichroic molecules comprise anthroquinones or azo compounds.

According to another secondary feature, the nematic liquid crystals comprise at least one of the following molecules: phenylcyclohexane, biphenylcyclohexane and cyclohexylcyclohexane.

BRIEF DESCRIPTION OF THE DRAWINGS

The invention is described in greater detail hereinafter relative to non-limitative embodiments and the attached drawings, wherein show:

FIGS. 1a and 1b respectively the two, i.e. cholesteric and homeotropic states of a dichroic display according to the invention.

FIGS. 2a and 2b respectively the two, i.e. cholesteric and homeotropic states of a dichroic display according to the invention in which the inner face of the walls is covered with an alignment coating.

FIG. 3a the absorption of a light vector as a function of the orientation of the dye molecules and FIG. 3b the different orientation of the dye molecules contained in different planes of the liquid crystal film.

FIG. 4 in the form of a group of curves, the ellipticity of the light wave which is absorbed least on passing through the cell as a function of the pitch p of the twisted or helical structure and the optical anisotropy $\Delta n$ of said cell.

DETAILED DESCRIPTION OF THE PREFERRED EMBODIMENTS

FIGS. 1a and 1b shows a sectional view of a liquid crystal dichroic cell. It comprises a first wall 2 carrying an electrode 4 and a second wall 6 carrying an electrode 8 and covered by a reflecting coating 10. A cholesteric liquid crystal film is inserted between these two walls. Dye molecules 14 are dissolved in the liquid crystal, in order to increase the contrast of the cell. The orientation of these molecules is induced by the orientation of the cholesteric liquid crystal molecules. The dye molecules are preferably anthroquinones or azo quinones.

In the absence of a potential difference between electrodes 4 and 8, the liquid crystal has a helical structure. Thus, the dye molecules are successively oriented in accordance with all directions in space, in a plane parallel to the cell walls. The incident light beam, whose propagation vector k is shown in this case highly absorbed, because the polarization of the light beam is parallel to the major axis of certain dye molecules.

FIG. 1b illustrates the orientation of the liquid crystal and dye molecules, when a potential difference is applied between electrodes 4 and 8 of the two liquid crystal cell walls. In this case, the liquid crystal molecules 12 are oriented perpendicular to the cell walls. The dye molecules are oriented in the same sense. The light beam is in this case weakly absorbed, because the major axis of the dye molecules and the polarization of the light beam are perpendicular.

According to the invention, the reflecting coating 10 on the inner face of one of the walls of the liquid crystal cell is of a metallic type. Such a liquid crystal cell has a much better contrast than that of known cells. This contrast improvement only applies in the case of certain special values of the pitch p of the helical structure and of the optical anisotropy $\Delta n$. These values will be given in connection with FIG. 4.

In FIGS. 1a and 1b, the reflecting coating 10 covers the lower wall of the cell. By choosing an adequate material, electrode 8 can be used as the reflecting coating.

A description will now be given of a constructional variant of the liquid crystal cell according to the invention. This description relates to FIGS. 2a and 2b, which respectively show the liquid crystal cell in its absorbing state and in its transparent state. The same elements as in FIGS. 1a and 1b are given the same references.

An orientation coating 16, 18 has in this case been added to the inner face of each of the walls. These coatings induce a homeotropic orientation of the molecules of liquid crystal 12 and the molecules of dye 14 located in the vicinity of the walls.

In the absence of a potential difference between the two walls, the liquid crystal film has a helical structure, as in the case of FIG. 1a, and in addition the cells in the vicinity of the walls are raised. When a potential difference is applied between the electrodes of the two walls, the liquid crystal molecules and the dye molecules are aligned perpendicular to the walls, as in the case of FIG. 1b.

The addition of alignment coatings 16, 18 to the inner face of the two walls is not fundamental. However, it has the advantage of aiding the switching of the molecules when a potential difference appears between the walls.

The absorption of the light beam by the dye molecules is a function of the respective direction of the light polarizaton vector and the major axis of the dye molecule. FIG. 3a shows the dye molecule in three successive positions $P_1$, $P_2$, $P_3$, along the light beam propagation axis Z.

Plane XY is parallel to the cell walls. Thus, positions $P_1$ and $P_3$ correspond to a dye molecule parallel to the liquid crystal cell walls, whilst position $P_2$ corresponds to an orientation perpendicular to said walls (homeotropic).

The absorption of the light beam is maximum when the light polarization vector is parallel to the major axis of the dye molecule. The absorption is minimum when the light polarization vector is in a plane perpendicular to the major axis of the dye molecule. The corresponding absorption coefficients are respectively designated $K_a$ and $K_b$.

The privileged propagation modes are the light vectors undergoing a minimum or maximum absorption. In the case of the dye molecule $P_1$, these privileged modes are those for which the polarization vector is respectively parallel to the Y axis and the X axis.

In the case e.g. of a Heilmeier cell, where all the dye molecules have the same orientation, the privileged propagation modes are linearly polarized light waves. In the case of a White-Taylor cell as shown in e.g. FIG. 3b, the direction of the dye molecules varies with the depth in the cell.

Thus, the two privileged propagation modes are then no longer linearly polarized waves and are instead elliptically polarized waves. The absorption coefficients associated with these modes are designated respectively $K_1$ and $K_2$ and satisfy:

$$K_b < K_2 < \frac{K_a + K_b}{2} < K_1 < K_a$$

The ellipticity of these two privileged modes varies as a function of numerous parameters, including the pitch p of the helix, the optical anisotropy $\Delta n$ of the medium, the propagation vector in vacuum k equal to $2\pi/\lambda$ in which $\lambda$ is the wavelength in vacuum of the light beam, the propagation vector in an absorbing isotropic medium $k_m = 2\pi/\lambda \cdot n_m$ in which $n_m$ is the mean complex optical index of the medium and the attenuation coefficient.

In particular, when the pitch of the helix decreases and/or the optical anisotropy decreases, the privileged propagation modes have an ellipticity approaching $\pi/4$ (circular wave).

The absorption coefficients $K_1$ and $K_2$ also vary as a function of these parameters. In particular, $K_1$ increases with the pitch p of the helix, whereas $K_2$ decreases with said pitch. In the limit case when p is infinity, (e.g. Heilmeier cell), coefficients $K_1$ and $K_2$ are respectively equal to $K_a$ and $K_b$.

FIG. 4 illustrates the ellipticity of the least absorbed propagation mode as a function of the pitch p of the helix and the optical anisotropy $\Delta n$. This is the propagation mode which is absorbed least on passing through the cell and without reflection on a cell wall.

FIG. 4 shows constant ellipticity curves $C_1$, $C_2$, ... $C_7$, the ellipticity thereof increasing from $C_1$ to $C_7$. It is less than $\pi/8$ for curves $C_1$, $C_2$ and $C_3$ and more in the case of curves $C_5$, $C_6$ and $C_7$. Curve $C_4$ corresponds to an ellipticity of $\pi/8$, i.e. an intermediate wave between a linear wave and a circular wave.

The hatched area 30 corresponds to the standard range of use of White-Taylor liquid crystal dichroic displays. Such a display has a diffusing reflecting coating.

However, the invention relates to a liquid crystal dichroic display such that the ellipticity of the least absorbed mode exceeds $\pi/8$, which corresponds to the range beneath curve $C_4$. According to the invention, these displays have a metallic reflecting coating.

It has experimentally been found that this makes it possible to significantly improve the display contrast. Thus, by comparing the absoption of a wave in the case where the reflecting coating is of the diffusion type and in the case where the coating is of the metallic type, improvement is made obvious. For this purpose, consideration will be given to the decomposition of a wave $O$ on the base $(O_1, O_2)$ of the privileged propagation modes, $O_1$ being the least absorbed wave and $O_2$ the most absorbed wave, so that we obtain $O = a_1 \cdot O_1 + a_2 \cdot O_2$ where $a_1$ and $a_2$ respectively designate the intensity of each component of wave $O$.

For simplification purposes, the extreme case will be taken where the absorption coefficient is zero for wave $O_1$ and infinity for wave $O_2$. After passing through the cell, as the absorption coefficient of wave $O_2$ is infinity, wave $O$ is reduced to its least absorbing component, i.e. $a_1 \cdot O_1$. The reflection of this wave on a diffusing coating modifies wave $O$, whose intensity will be equally distributed (diffusion property) according to the two modes.

Just following reflection, wave $O$ will then be written: $O = b_1 \cdot O_1 + b_1 \cdot O_2$ with $2b_1^2 = a_1^2$. On passing through the cell a second time, the component according to the most absorbed mode will disappear, so that wave $O$ will be reduced to $b_1 \cdot O_1$.

However, if the reflecting coating is of the metallic type, wave $O$ equal to $a_1 \cdot O_1$ following the passage through the cell, will, on reflection, decompose in unequal manner on the base $(O_1, O_2)$. The reflected wave will then be equal to $c_1 O_1 + C_2 O_2$ with $c_1^2 + c_2^2 = a_1^2$, in which the respective intensities $c_1$ and $c_2$ of the reflected wave components are a function of the ellipticity of the least absorbed wave $O_1$, i.e. a function of pitch p of the helix and of the optical anisotropy $\Delta n$. During the second passage through the cell, the component according to the most absorbed mode $O_2$ will disappear, so that wave $O$ will be reduced to $c_1 \cdot O_1$.

If the ellipticity of wave $O_1$ exceeds $\pi/8$, the intensity $c_2$ of the component of the reflected wave according to the most absorbed mode exceeds the intensity of the component of the reflected wave according to the least absorbed mode. In this case, the intensity of the wave $O$ remaining following a double passage through the cell will be weaker than in the case of a diffusing reflection ($c_1 < b_1$).

Numerically, with a diffusing reflection, the contrast is approximately 4 to 1, whereas with a metallic reflection it can reach a ratio of 10 to 1.

What is claimed is:

1. A liquid crystal dichroic display with a high brightness contrast, comprising a liquid crystal film between two walls separated by a shim, one wall carrying transparent electrodes and the other wall a counterelectrode, said liquid crystal film having an optical anisotropy $\Delta n$ and, in the absence of an electric field, a twisted or helical structure of pitch p, the wall carrying the counterelectrode being at least partly covered with a reflecting coating reversing the polarization of a circularly polarized electromagnetic wave and the optical anisotropy $\Delta n$ and the pitch p being such that the light wave absorbed least by the display used in transmission has an ellipticity at least equal to $\pi/8$.

2. A dichroic display according to claim 1, wherein the reflecting coating is constituted by the counterelectrode.

3. A dichroic display according to claim 1, wherein the liquid crystal film comprises a mixture of a nematic liquid crystal, dye molecules and a chiral compound.

4. A dichroic display according to claim 3, wherein the chiral compound is a cholesteric liquid crystal.

5. A dichroic display according to claim 3, wherein the dye molecules comprise anthroquinones or azo compounds.

6. A dichroic display according to claim 3, wherein at least one of the liquid crystals comprises phenylcyclohexane, biphenylcyclohexane and cyclohexylcyclohexane.

* * * * *